Oct. 16, 1956  C. A. DE GIERS  2,766,623
FLOAT-OPERATED CAPACITANCE DEVICE
Filed Jan. 19, 1955  2 Sheets-Sheet 1
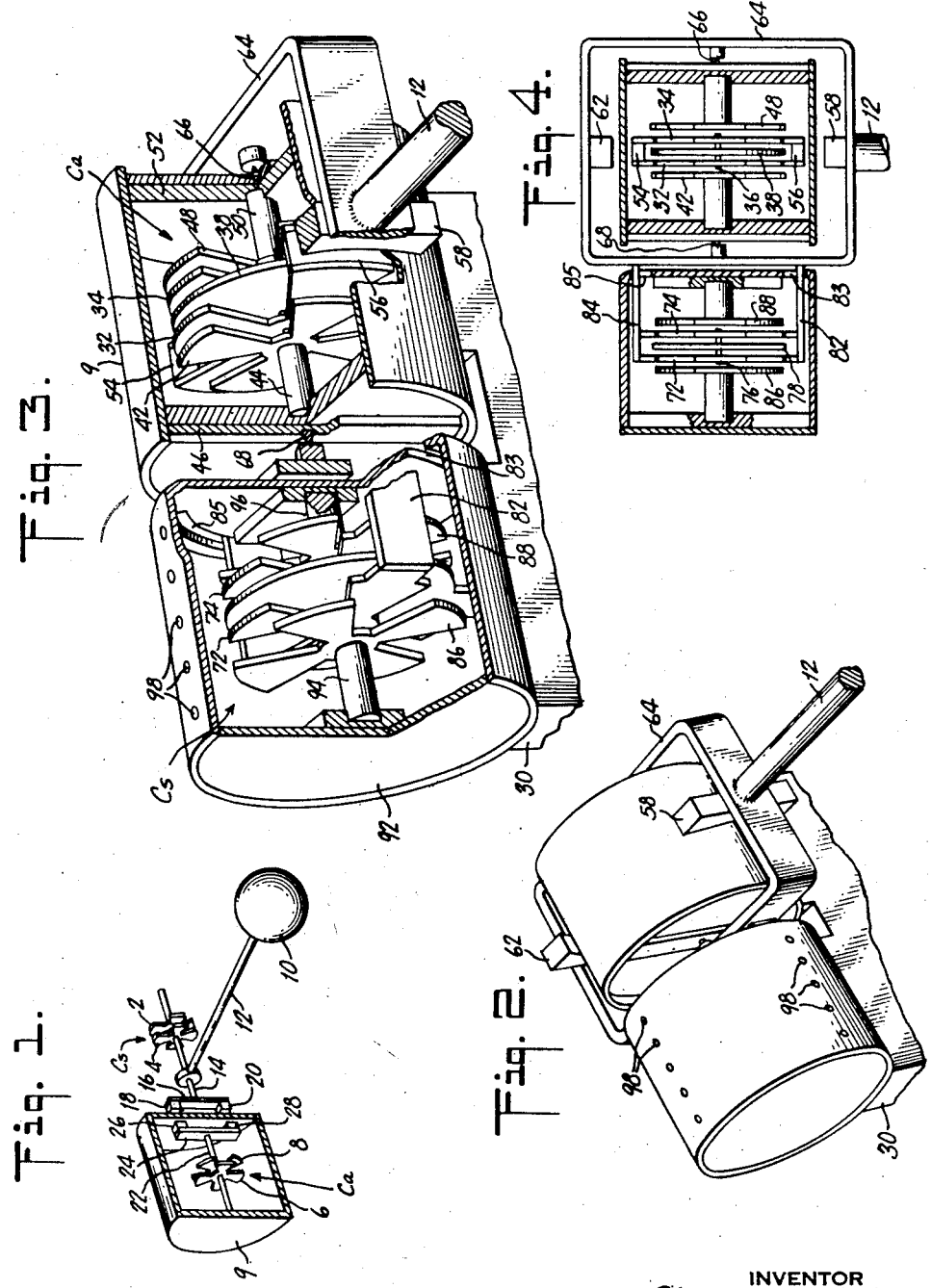
INVENTOR
Clarence A. de Giers
BY R. J. Dearborn
ATTORNEY

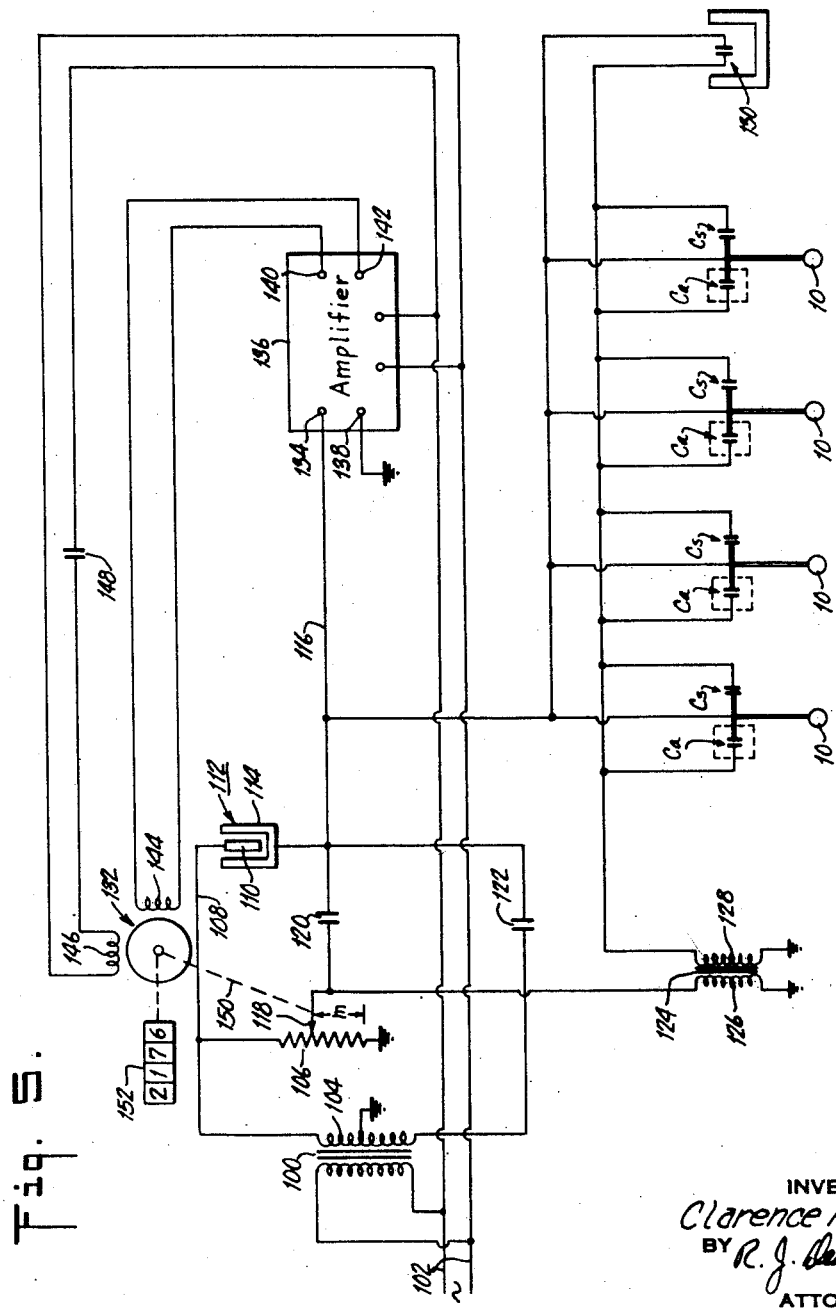

United States Patent Office 2,766,623
Patented Oct. 16, 1956

2,766,623

FLOAT-OPERATED CAPACITANCE DEVICE

Clarence A. de Giers, Roslyn, N. Y., assignor to The Liquidometer Corporation, Long Island City, N. Y., a corporation of Delaware Application January 19, 1955, Serial No. 482,785

13 Claims. (Cl. 73—304)

The present invention relates to a float-operated capacitance device and liquid weight measuring means using said device. Such apparatus preferably embodies a density-responsive capacitance apparatus for producing a capacitance having a predetermined relationship with the density and dielectric constant of a liquid. Thus the device is adapted to compensate automatically for changes in the density of liquids with which the device may from time to time be used and also to compensate similarly for changes in the dielectric constant of such liquids. In its preferred embodiment, the device is adapted to form a part of a complete system for measuring the quantity of a liquid in terms of weight and to compensate automatically for changes in density and/or dielectric constant so as to give an accurate reading in terms of the weight of the liquid at all times.

The measuring element, usually called the measuring condenser, of such capacitive-type gauge systems usually consists of a condenser formed of two spaced concentric metal cylinders extending vertically from the top to the bottom of the tank. Openings are provided to admit the liquid to the space between the inner and outer cylinders so that the liquid finds its own level between the cylindrical plates corresponding to the level of the liquid in the tank. As the liquid level rises in the tank, the air between the plates is gradually replaced by the liquid. Because liquids have higher dielectric constants than air, the capacity measured between the plates increases as the liquid level rises, by an amount depending upon the depth of the liquid and its dielectric constant.

It will be clear that any variation in the dielectric constant of the liquid will interfere with the accuracy by which the liquid quantity can be determined by measuring the capacity of the measuring condenser.

Moreover, in certain applications it is important to determine the amount of liquid in a tank in terms of weight. For example in fuel gauge systems for use on aircraft, it is important to know the weight of fuel in the tank accurately. The measurements must be independent of any variations in the dielectric constant and in the density of the liquid. Accordingly, it is necessary to include in capacitive-type gauge systems some means responsive to variations in the density and some means responsive to changes in the dielectric constant of the liquid. The present invention provides a capacitance, the value of which bears a predetermined relationship to the density and dielectric constant of the liquid, the relationship being of such form as to provide convenient electrical compensation for variations in dielectric constant and density respectively.

If we designate the capacity of the measuring condenser when the tank is empty as $C_0$, then the capacity of this condenser when it is filled with liquid will be $KC_0$, where $K$ is the dielectric constant of the liquid. At intermediate levels the measuring condenser will have proportionate values of capacitance. Assuming the tank to have uniform cross-sectional dimensions, so that the condenser has uniform dimensions throughout its length and denoting the proportionate depth of the liquid as "X" (depth of liquid in the condenser divided by total height of the condenser), the capacitance $C$ of the condenser at any level of the liquid is:

$$C = KXC_0 + C_0(1-X)$$

or $$C = C_0 + XC_0(K-1)$$

The total weight of liquid is then:

$$W = BdC$$

where "B" is a constant and "$d$" is the density of the liquid. The correction factor to be applied to the capacitance measuring system must be of the form:

$$d(K-1)$$

The preferred embodiment of this invention provides a correction capacity which is proportional to $(K-1)$ and which increases proportionately with the density of the liquid.

The foregoing and other objects and advantages of the invention will be apparent from the following description of apparatus embodying the invention considered together with the accompanying drawings, in which:

Figure 1 is a diagrammatic perspective view illustrating the operation of one embodiment of the invention and illustrating the principles thereof, the float being shown at the lower end of its path of movement;

Fig. 2 is a partial perspective view of a density-responsive capacitance device operating in accordance with the principles to be explained in connection with Fig. 1;

Fig. 3 is an enlarged perspective view of the apparatus of Fig. 2 with certain portions cut away to show the internal construction, the parts being in their relative position with the float at the upper end of its path of movement;

Fig. 4 is a horizontal sectional view of the apparatus shown in Fig. 2; and

Fig. 5 is a schematic diagram of a fuel gauge system incorporating the invention.

The diagrammatic representation of Fig. 1 will serve to illustrate the principles of the present invention. A first capacitor $Cs$ is formed by a fixed plate 2 and a movable plate 4. A second capacitor $Ca$ is formed by a fixed plate 6 and a movable plate 8 and is positioned inside a hermetically sealed container 9 which is filled with air at about atmospheric pressure.

The entire apparatus is positioned near the bottom of the tank, the liquid contents of which is to be measured, so that it is always entirely immersed in the liquid. The two capacitors are arranged to be simultaneously operated by a float 10 constructed so that when the liquid has less than a predetermined density, the float will sink in the liquid to the position shown in Fig. 1. With a slight increase in the density of the liquid, however, the float 10 will rise to an extent permitted by a mechanical limitation placed on the float movement in each direction.

The float 10 is connected by an arm 12 to a shaft 14 that is pivotally supported by any desired means so that as the float 10 rises and falls, it pivots about the axis of the shaft 14 and causes a corresponding rotation of that shaft. One end of the shaft 14 is connected directly to the movable plate 4 of the capacitor $Cs$. The other end of this shaft is operatively connected through magnetic coupling means to the other capacitor $Ca$. For this purpose, the shaft 14 carries a cross-arm 16 which at its ends has projecting permanent magnet elements 18 and 20 by which the rotary motion is transmitted to the movable element of the capacitor $Ca$ within the container 9.

Inside the container 9 the movable plates 8 of the capacitor $Ca$ are connected by a shaft 22 to a cross-arm 24 that carries magnetic elements 26 and 28 at each end. The magnetic elements 26 and 28 may be permanent magnets; or, if the outside elements 18 and 20 are permanent magnets, the elements 26 and 28 may be formed of soft iron. The magnetic elements 26 and 28 are spaced a slight distance from the end wall of the container 9, which is formed of some non-magnetic material, such as copper. The outer magnetic elements 18 and 20 are positioned near the outside of the wall of the container 9, so that as the shaft 14 is rotated by the rise or fall of the float 10, the inner magnetic elements 26 and 28 will follow the outer magnetic elements and cause the movable plates of the capacitors $C_a$ and $C_s$ to rotate in unison.

The plates of these capacitors $C_a$ and $C_s$ have the general shape shown, that is, generally fan-shaped with four tapered radial blades the width of which increases with increasing distance from the center. Each capacitor segment occupies an arc of about 45 degrees, so that the space between successive segments is equal to the width of the segments at the same distance from the center of the plate. Each capacitor has a maximum capacity when the segments of the adjacent plates are positioned directly opposite each other and a minimum capacity when one of the plates is rotated 45 degrees with respect to the other, so that each segment of one plate is opposite the space between the segments of the adjacent plate. The float movement is limited by means (not shown) to about 45 degrees and is so arranged as to move the associated capacitors between their positions of maximum and minimum capacitance as hereinafter specifically set forth. The two capacitors $C_s$ and $C_a$ are connected in parallel electrically as best shown in Fig. 5, which will be discussed later.

In operation, assume the density of the liquid in which the capacitor system is immersed to increase sufficiently to cause the float 10 to rise and rotate the shaft 14 counter-clockwise from the position shown in Fig. 1. The plates of the capacitors are arranged so that when the capacitor $C_a$ has maximum capacitance, the capacitor $C_s$ has minimum capacitance and vice versa. The size and spacing of the plates of the two capacitors $C_a$ and $C_s$ are identical so that their minimum and maximum capacitances, when both capacitors are in air, are equal. The capacitor $C_s$ is immersed in the liquid so that the space between its plates is completely filled with liquid. Its minimum capacity can then be designated as $KC_1$, where "K" is the dielectric constant of the liquid, and its maximum capacity as $KC_2$. The capacitor $C_a$ is inside the hermetically sealed container 9, which is filled with air. As aforesaid, the capacitor $C_a$ is identical in dimensions and construction with the capacitor $C_s$, so that its minimum capacitance is $C_1$ and its maximum capacitance is $C_2$.

As shown, Fig. 1, the float 10 is at its lower position with the capacitor $C_s$ at its maximum capacity position and the capacitor $C_a$ at its minimum capacity position. When the float 10 rises, the change in the capacitance of the capacitor $C_s$ is equal to $KC_1-KC_2$. Simultaneously, the capacitance of the air capacitor $C_a$ increases and the change in its capacity is equal to $C_2-C_1$.

The two capacitors, $C_a$ and $C_s$, are connected in parallel so that the net change in capacitance is:

$$KC_1-KC_2+C_2-C_1$$
or
$$[C_1-C_2](K-1) \qquad (1)$$

The variation in capacity is thus of such a nature that it can be incorporated in different types of capacitance liquid level gauges. The sizes and arrangement of the capacitors, and for example, whether a particular capacitor increases or decreases in capacity when the float rises, will in practice depend upon the measuring circuit that is being used.

The compensation for change in density is accomplished by using a number of float-operated capacitor arrangements, each of which may be equivalent to that illustrated in Fig. 1. The floats are arranged for independent operation, each float being weighted so that as a group they form a graduated series of density-responsive devices, each float rising in a liquid of slightly different density from the others. For example, in a particular measuring system, the lightest float might be adjusted to rise in a liquid having a density of 0.690, with successively heavier floats adjusted respectively to rise at densities of 0.694; 0.698; 0.702; and 0.706. It will be clear that any number of floats can be used over any given range of densities, and that increasing the number of floats will decrease the incremental change produced by each float thus providing greater accuracy of compensation or will give a greater range of density response, or both. Whether the increments of density change for the operation of each successive float are equal or unequal will depend upon the characteristics of the particular measuring system with which the capacitor assembly is used.

In most systems all of the capacitors in the density-responsive apparatus will be connected in parallel; and usually the difference between minimum and maximum capacitance of a single one of the pairs of capacitors is very small. For example, in some systems, a change of three to five micromicrofarads between minimum and maximum positions of the capacitor rotor is sufficient. For this reason, the entire assembly can be very small, so that a large number of the float operated devices can be positioned in a small space.

Figs. 2, 3 and 4, show a modified arrangement of float-operated capacitors in which certain of the parts have been indicated by the same reference characters as corresponding parts of Fig. 1.

In Fig. 3, the capacitor $C_a$ is mounted within the hermetically sealed cylindrical container 9 formed of non-magnetic material and which is supported by a base 30. In this example the capacitors $C_a$ and $C_s$ are each constructed with four plates in such manner as to eliminate the necessity for making electrical connection to the movable plates. This is particularly important in systems in which the increments between operation of the successive floats are small, so that each float must rise or fall with only very slight changes in the density of the liquid. Any extra frictional loading such as would be caused by making electrical connection to the float-operated capacitor plates, would increase the incremental change in density necessary to make the float move from one of its positions to the other.

The two movable plates 32 and 34 of the capacitor $C_a$ are rotatably mounted on a shaft 36 (Fig. 4) which is supported by a fixed circular shielding plate 38, which is positioned between the plates 32 and 34 and rigidly supported by the container 9 and the base 30. This shielding plate 38 has the same diameter as the plates 32 and 34 and serves as an electrostatic screen, which in this example is grounded to the base 30, so that the capacitor $C_a$ is in effect formed of two separate series-connected capacitor sections. The first capacitor section is formed by the movable plate 32 and an adjacent fixed plate 42 which is supported by a horizontal post 44 secured to the end wall 46 of the container 9. The second capacitor section is formed by the movable plate 34 and an adjacent fixed plate 48 supported by a second horizontal post 50 secured to the opposite end wall 52 of the container 9.

The fixed plates 42 and 48 are insulated from the metal container 9 in any desired manner, for example by forming the supporting posts 44 and 50 of non-conducting material or by the use of insulating bushings at either end of these posts. The movable plates 32 and 34 are also insulated from the shielding plate 38 by the use of bushings of insulating material around the shaft 36.

The two movable plates 32 and 34 are connected together electrically and also mechanically by two pieces of magnetizable material 54 and 56. An additional electrical connection can be made if desired by one or more separate conductors of material of higher conductivity. The magnetizable element 56 as shown joins the ends of two segments of the plates 32 and 34, which are extended in length by a distance sufficient to permit the magnetizable element 56 to clear the shielding plate 38. The outer surface of the magnetizable element 56 is arcuate with its curvature corresponding to the curvature of the inner surface of the cylindrical wall of the container 9 so that the magnetizable element is spaced only slightly from the inner wall of the container.

The mangetizable element 54 joins corresponding segments of the plates 32 and 34 on the opposite side of the capacitor in the same manner.

The plates 32 and 34 are moved by the float 10 through the medium of two permanent magnet elements 58 and 62, Fig. 4, which are positioned outside the cylindrical wall of the container 9 directly opposite the magnetizable elements 56 and 54 respectively. The inner surfaces of the magnetic elements 58 and 62 are concave, each with a curvature corresponding to the outer curvature of the cylindrical wall of the container 9.

The magnetic elements 58 and 62 are supported on the inner surface of a rectangular yoke 64 extending completely around the container 9. This yoke is rotatably supported by two pivot points 66 and 68, mounted respectively at the centers of the end walls 52 and 46 of the container 9.

The arm 12 which carries the float 10 is secured to this yoke 64, so that as the float 10 rises or falls, the yoke 64 rotates around the outside of the stationary container 9. This rotary movement of the yoke 64 causes a corresponding rotation of the capacitor plates 32 and 34.

Electrical connections are made by leads (not shown in these views) connected to the fixed plates 42 and 48. In the position of maximum capacity, as shown in Fig. 3, the segments of the plates 32 and 42 are directly opposite one another and the segments of the plates 34 and 48 are also in alignment with each other. When the yoke 64 is rotated 45 degrees by movement of the float 10 to its other terminal position, the segments of the movable plates 32 and 34 are moved to their position of minimum capacitance, in which the segments of the plates 32 and 34 are positioned directly opposite the spaces between the segments of the adjacent fixed plates. The total capacitance of the capacitor $Ca$ is the series capacitance of the two capacitor sections. In this example, the capacitances of the two sections are equal, so that the capacitance of $Ca$ is equal to one-half the capacitance between the fixed plate 42 and the movable plate 32.

The immersed capacitor $Cs$ is constructed in the same manner as the air capacitor $Ca$, except that it is mechanically coupled to the yoke 64. Its movable plates 72 and 74 are rotatably supported on a shaft 76 mounted in a fixed shielding plate 78 which is supported from the base 30. These plates 72 and 74 are electrically connected together and are mechanically connected by two driving members 82 and 84 to the yoke 64, suitable insulating means (not shown) being provided to insulate the plates electrically from the yoke 64 and from the shielding plate 78.

The fixed plates 86 and 88 of the capacitor $Cs$ are supported by the base 30 by means of a perforated cylindrical shield 92, which carries two horizontally-extending supporting posts 94 and 96, suitable insulating means being provided so as electrically to isolate these plates from each other and from the cylindrical shield 92. The shield 92 is provided with suitable openings as at 98, so that the interior of this shield is at all times filled with a representative sample of the liquid.

The two driving members 82 and 84 for the movable plates 72 and 74 of the immersed capacitor $Cs$ are arranged as shown, Figs. 3 and 4, to pass through arcuate slots 83 and 85 respectively in the end wall of the shield 92. These slots may be used also to limit the float movement to substantially 45 degrees and may further be used in conjunction with the positioning of the several condenser plates to assure the conditions of maximum and minimum capacitance for the condensers $Cs$ and $Ca$ at the terminal positions of the float movement as set forth in describing Fig. 1. The capacitors $Ca$ and $Cs$ in this form of the invention are related to each other in the same ways as described in connection with Fig. 1.

Fig. 5 illustrates a capacitance-type fuel gauge system utilizing the density responsive arrangement described above in which the weight of fuel is indicated directly. This fuel gauge system may be similar to the one described in U. S. patent application, Ser. No. 166,898, filed June 8, 1950, but a number of the float-operated capacitors described above are connected in parallel with the submerged reference capacitor, and the capacity of the submerged capacitor is reduced accordingly.

In the arrangement shown in Fig. 5, power in the form of A. C. electrical energy is supplied to a balanceable network through a transformer 100, the primary winding of which is connected across alternating current power means 102. The secondary winding of the transformer 100 is connected to the common ground circuit at its mid-point, and one end of this winding is connected to one end of a relatively low resistance potentiometer 106 and also by a lead 108 to the inner cylindrical plate 110 of a conventional measuring condenser 112. The outer cylindrical plate 114 of this condenser is connected to the output lead 116 of the balanceable network. It will be understood that the condenser 112 has its plates immersed in the liquid to be measured to an extent dependent upon the level thereof and therefore that the capacitance of this condenser is a function of the level and of the dielectric constant of the liquid.

The other end of the potentiometer 106 is connected to the common ground circuit, and the slidable tap 118 is connected through a fixed capacitor 120 to the output lead 116. The opposite end of the transformer secondary winding 104 is connected through a second fixed capacitor 122 to the output lead 116. The slidable contact 118 of the potentiometer 106 is also connected as hereinafter described through the float-operated capacitors $Ca$ and $Cs$ (all connected in parallel) to the output lead 116. The current supplied to this circuit to these capacitors is equal in voltage, but opposite in phase, to that supplied through the capacitor 120. A transformer 124 is utilized to reverse the phase of the current.

The sliding contact 118 of the potentiometer 106 is directly connected through the primary winding 126 of the transformer 124 to the common ground circuit. One end of the secondary winding 128 of this transformer is connected to the common ground circuit and the other end is connected to one fixed plate of each of the float-operated capacitors $Ca$ and $Cs$ and is connected also to one of the plates of a reference capacitor 130 which is always completely submerged in the liquid being measured.

The other fixed plates respectively of each of the submerged capacitors $Cs$ and of the air capacitors $Ca$, together with the other plate of the submerged capacitor 130, are connected together and to the output lead 116. In the diagrammatic showing of Fig. 5 the second named fixed plates of the several capacitors $Ca$ and $Cs$ are shown as movable plates in a manner similar to the showing of Fig. 1. It will be understood, however, that the use of devices for $Ca$ and $Cs$ as shown in Figs. 2, 3 and 4 is contemplated. In this particular example four floats 10 are provided, each arranged to operate a submerged capacitor $Cs$ and an air capacitor $Ca$, which is isolated from the liquid in the tank as aforesaid. As described above, each of the floats 10 is arranged to move from its lower position to its upper position at a slightly different density of the liquid, so that the capacitors $Ca$ and $Cs$ are successively changed from one position to the other as the density of the liquid increases or decreases over the operating range of the instrument. The capacitor 130 is provided with spaced plates and is at all times submerged in the liquid with the space between the plates completely filled with the liquid. This capacitor corresponds to the totally submerged compensating capacitor described in connection with the above-identified patent application, Ser. No. 166,898, except that in accordance with the present invention the capacity of this condenser 130 has been reduced by an amount equivalent to the total capacity introduced into the circuit by the float-operated capacitors $C_a$ and $C_s$ (calculated on a liquid-free basis).

In order to maintain this network in balance condition, the voltage appearing between the output lead 116 and the common ground circuit is used to control a reversible electric motor 132 arranged mechanically to adjust the sliding contact 118 of the potentiometer 106 to rebalance the network and thereby to reduce the voltage on the output lead 116 to zero. In order to accomplish this, the lead 116 is connected to an input terminal 134 of a conventional electronic amplifier indicated in block form at 136. The other input terminal 138 of this amplifier is connected to the common ground circuit. The output terminals 140 and 142 of this amplifier are connected to one of the field windings 144 of the motor 132. The other field winding 146 of this motor is connected through a phase-shifting capacitor 148 to the alternating current supply mains 102.

The armature of the motor 132 is coupled mechanically through suitable reduction gearing, indicated diagrammatically by the broken line 150, to the sliding contact 118 of the rebalancing potentiometer 106. A counter-type indicator 152 also is driven mechanically by the motor 132 and denotes the weight of the liquid in the tank.

It will be noted that a first alternating current is supplied to the output lead 116 through the measuring condenser 112 and that a second current of the same frequency and supply voltage but opposite in phase is supplied to the output lead 116 through the capacitor 122. The capacitor 122 is equal in capacity to the measuring condenser 112 when the tank is empty.

Another current is supplied to the output lead 116 through the capacitor 120, which has the same capacitance as the capacitor 122. This current is of the same phase as the current supplied to the measuring condenser 112 but its magnitude can be adjusted by means of the sliding contact 118. The compensating current supplied to the parallel connected submerged and air capacitors $C_s$ and $C_a$ is opposite in phase to that supplied to the capacitor 120. If the current supplied to the measuring condenser 112 and the capacitor 120 is equal to the total current supplied through the fixed capacitor 122 and all of the submerged and air capacitors $C_a$ and $C_s$ in addition to the reference capacitor 130, the currents will cancel and no signal will appear on the output lead 116. However, if the currents are unequal, an unbalance signal will appear on the lead 116, its phase depending upon which of these two currents is the larger. The direction of the rotation of the motor is controlled by the phase of this unbalance signal, this motor being arranged to adjust the potentiometer 106 in such direction as to reduce this unbalanced voltage to zero.

The capacitor 122, having the same capacitance as the measuring condenser 112 when the tank is empty, but supplying a current of opposite phase, can be considered in conjunction with the measuring condenser 112 to be equivalent, for the purpose of explanation of the circuit, to a single condenser in the position occupied by the measuring condenser 112 and having a capacity equal to the difference between the capacities of the measuring condenser 112 and the fixed capacitor 122. The effect of the capacitor 122 therefore is to eliminate by subtraction the constant term $C_0$ from the expression given above for the capacitance of the measuring condenser 112 in the equation $C = C_0 + XC_0(K-1)$.

The voltages applied to the fixed capacitor 120 and the compensating capacitance network are equal in magnitude and opposite in phase. So that the capacitor 120, together with the submerged capacitors can be considered as equivalent to a single capacitor substituted for all of the submerged capacitors $C_s$, $C_a$ and 130 and having a capacitance value equal to the difference between the capacity of the capacitor 120 and the total of the capacitances of all of the submerged capacitors $C_s$, $C_a$ and 130.

The effect of this circuit arrangement is to produce a current that is proportional to "$K-1$," so that the corresponding term in the expression for the capacitance of the hypothetical capacitor equivalent to the measuring condenser 112 and the capacitor 122 can be eliminated.

Assume that the system is in balance with zero voltage on the output lead 116 and that the liquid in the tank is then replaced with a liquid of slightly greater density, so that one of the float members 10 moves to its upper position. This change moves the associated air capacitor $C_a$ from its position of minimum capacity to its position of maximum capacity, and also simultaneously moves its associated submerged condenser $C_s$ from its position of maximum capacity to its position of minimum capacity. This change decreases the capacitance of the compensating circuit by an amount equal to the change in capacitance of the air condenser $C_a$ multiplied by "$K-1$" (see Expression 1 above). The unbalance signal applied to the output lead 116 by the change in density is in such direction as to cause the motor 132 to move the slider 118 upwardly, thus increasing the voltage applied to this portion of the network and rebalancing the system. The reading of the indicator 152 would be increased by the amount necessary to reflect the increase in the weight of the liquid.

The sizes of the capacitors $C_a$ and $C_s$ will be selected to introduce a change proportional to the change in density of the liquid. The size obviously will depend upon the difference in density required for the successive floats to move from one position to the other.

The condition for balance of the network, without the float-operated capacitors, is as follows:

$$C_0 + C_0 X(K-1) + mC_0 - C_0 - mKC_0 = 0 \qquad (2)$$

where "$C_0$" is a value equal to the capacitance of the measuring condenser 112 when the tank is empty; "$X$" is the proportion of the tank condenser that is filled with liquid as previously defined, "$K$" is the dielectric constant of the liquid; and "$m$" is a proportional factor equal to the resistance of the potentiometer 106 between the slider 118 and ground divided by the total resistance of the potentiometer. This balance condition is discussed more fully in the above-identified application Ser. No. 166,898. It will be observed that the balance condition exists when "$m$" is equal to "$X$." In order that the reading of the counter 152 will be proportional to the weight of liquid, the balance condition must be $$m = DX \qquad (3)$$

where "$D$" is proportional to the density of the liquid. This balance condition will be brought about if the last term "$mKC_0$" of the above balance Equation 2 is changed to:

$$m\left(C_0 + \frac{(K-1)C_0}{D}\right) \qquad (4)$$

This change is achieved by the addition of the float-operated capacitors $C_a$ and $C_s$. The change in capacity of each of the capacitors $C_a$ between its positions of maximum and minimum capacitance is designated as $C_f$ (this value is also equal to the corresponding change in capacity of each capacitor $C_s$ if it were positioned in air) so that when a float 10 is in its "up" position the total capacity of its two capacitors $C_a$ and $C_s$ is:

$$C_{1a} + C_f + KC_{1s} \qquad (5)$$

where $C_{1a}$ is the minimum capacitance of the capacitor $C_a$ and $KC_{1s}$ is the minimum capacitance of the capacitor $C_s$. When the float is in its "down" position, these capacitors have a total capacitance value of $$C_{1a} + KC_f + KC_{1s} \qquad (6)$$

The residual capacitances are constant and need not enter into the final balance equations. This is because the total residual capacitance of the capacitors $Ca$ can be completely compensated by a corresponding increase in the value of the capacitor 120, and the total residual capacitance of the submerged capacitors $Cs$ can be considered as part of the capacitor 130.

The total capacity designated "$Cc$" of the float-operated capacitors and the submerged capacitor 130 is:

$$Cc = KC_{130} + KnC_f + (N-n)C_f \qquad (7)$$

where "$C_{130}$" is the capacitance of the capacitor 130 in air; "$n$" is the number of floats 10 that are in their "down" position; and "$N$" is the total number of floats 10 in the system.

Equation 6 can be rewritten as:

$$Cc = NC_f + C_{130} + (K-1)(nC_f + C_{130}) \qquad (8)$$

In order to satisfy the requirements of Expression 4 above, the value of the capacitor 130 is adjusted so that $$NC_f + C_{130} = C_0 \qquad (9)$$

Now let $$\frac{C_0}{D} = nC_f + C_{130} \qquad (10)$$

and from Equation 9

$$\frac{C_0}{D} = \frac{NC_f + C_{130}}{D} \qquad (11)$$

and:

$$\frac{nC_f + C_{130}}{D} = nC_f + C_{130}$$

or $$D = \frac{NC_f + C_{130}}{nC_f + C_{130}} \qquad (12)$$

Thus, if the values of the capacitors $Ca$, $Cs$ and 130, and the number of floats are selected to satisfy the requirements of Equation 12, the desired balance condition is obtained.

There follows an example of a set of values for the several circuit elements shown in Fig. 5 of the accompanying drawings which will represent a completely operative apparatus. Let it be assumed first that the gauge as a whole is to give true weight readings of liquid in a container wherein the range of specific gravity (density with respect to water) of the liquid to be gauged ranges from 0.6 to 0.9. It is further assumed for the purposes of this example that there will be twenty-five floats 10 used, each covering a density range for the liquid to be gauged (on the same basis) of 0.02.

On the basis of these assumptions, the following values will give a fully operative and practical gauge:

The voltage across each side of the transformer secondary 104 between the terminals thereof and the center tap ground may be 30 volts;

The potentiometer 106 may have a value of 2,000 ohms;

The tank condenser 112 and the submerged reference condenser 130 may have values, both measured with an air dielectric, of 50 M. M. F. each.

The total compensating capacity change ($NC_f$) for the twenty-five compensating condensers is 25 M. M. F. The capacity which is introduced by the float at one terminal of the series and which is actuated by a fluid density (specific gravity) of 0.89 should be 1.11 M. M. F. The capacity introduced by the float at the other extreme of the series which is actuated at a liquid density (specific gravity) of 0.61 should be 2.50 M. M. F.

With the above values, the system will give a maximum reading on the indicator when the tank is filled with fuel having a density (specific gravity) of 0.9. The gauge will read two-thirds full (.67 full) when the tank is completely filled with a liquid having a density or specific gravity of 0.6.

There has been described but one principal embodiment of the invention and as the description proceeded, certain equivalents have been indicated. I do not wish to be limited, however, except by the scope of the appended claims, which are to be construed validly as broadly as the state of the prior art permits.

What is claimed is:

1. Apparatus responsive to the density and dielectric constant of a liquid, comprising a float which is located so as always to be immersed in said liquid, means supporting said float for movement between vertically displaced positions, a first variable capacitor disposed so as always to be immersed in said liquid and having spaced relatively movable plates and being operatively connected to said float, said liquid filling the space between said plates, a second variable capacitor having spaced relatively-movable plates and being operatively connected to said float, said second capacitor being positioned below the surface of said liquid and adjacent to said first capacitor, and means serving hermetically to seal said liquid outside said plates of said second capacitor whereby the plates thereof are free of said liquid.

2. Density-responsive capacitance apparatus for producing a capacitance having a predetermined relationship with the density and dielectric constant of a liquid, comprising a first variable capacitor disposed so as always to be immersed in said liquid and having spaced plates with the space therebetween filled with said liquid, a second variable capacitor disposed below the level of said liquid adjacent to said first capacitor and having spaced plates with the space therebetween maintained free of said liquid by a housing for the plates of said second capacitor, a buoyant member disposed so as always to be immersed in said liquid and having a weight per unit volume which is predetermined with respect to the density of various liquids with which it may from time to time be used, said member being movable between vertically displaced first and second positions, and means operatively connecting said capacitors for simultaneous operation by the torque available from the movement of said buoyant member between its first and second positions by a predetermined variation in the density of said liquid, said capacitors being so arranged that as the capacitance of one capacitor increases, the capacitance of the other decreases.

3. Density-responsive apparatus in accordance with claim 2, in which the maximum and minimum capacitances of said first and second variable capacitors are respectively equal when the spaces between the plates of said capacitors are filled with media having the same dielectric constant.

4. Density-responsive apparatus in accordance with claim 2, in which each of the plates of each of said first and second variable capacitors is formed of a plurality of spaced radially-extending segments.

5. Density-responsive apparatus in accordance with claim 2, in which said second variable capacitor is totally enclosed within a housing having an external wall of non-magnetic material, so that the space between the plates thereof is maintained free of said liquid; and in which said means for operatively connecting said capacitors for simultaneous operation by movement of said buoyant member comprises magnetic coupling means positioned adjacent to the non-magnetic wall of said housing and on respectively opposite sides of said wall.

6. Density-responsive apparatus in accordance with claim 2, in which each of said first and second variable capacitors has two fixed plates, two movable plates disposed between said fixed plates in a direction perpendicular to their direction of movement, an electrostatic screen positioned between said movable plates, means mechanically connecting said movable plates for movement in unison, means electrically connecting said movable plates to one another, and means insulating said fixed plates from each other and from said movable plates, so that said fixed plates may be electrically connected to the terminals of each said condenser respectively.

7. Density-responsive capacitance apparatus for producing a capacitance having a predetermined relationship to the density and dielectric constant of a liquid, comprising a first variable capacity having a plurality of fixed plates, a plurality of movable plates, and means mechanically connecting said movable plates for movement in unison, the space between said plates being filled with said liquid; a second variable capacitor having a plurality of fixed plates, a plurality of movable plates, and means mechanically connecting said movable plates for movement in unison, a housing having a wall of non-magnetic material and completely enclosing said second capacitor, so that the space between the plates thereof is maintained free of said liquid; a buoyant member immersed in said liquid and having a weight per unit volume which is predetermined with respect to the density of various liquids with which it may from time to time be used, said member being movable between vertically displaced first and second positions; and means operatively connecting said capacitors for simultaneous operation by movement of said buoyant member between its first and second positions, the last named means including magnetic coupling means positioned adjacent to said non-magnetic wall, said capacitors being so arranged that as the capacitance of one capacitor increases, the capacitance of the other decreases.

8. Density-responsive capacitance apparatus for producing a capacitance having a predetermined relationship to the density and dielectric constant of a liquid, comprising a first variable capacitor having a plurality of fixed plates, a plurality of movable plates, and means mechanically connecting said movable plates for movement in unison, the space between said plates being filled with said liquid; a second variable capacitor having a plurality of fixed plates, a plurality of movable plates, and means mechanically connecting said movable plates for movement in unison, said second capacitor being sealed from said liquid and the space between its plates being free of said liquid, each of said plates of said first and second capacitors being formed of a plurality of spaced radial segments; a buoyant member immersed in said liquid and having a weight per unit volume which is predetermined with respect to the density of various liquids with which it may from time to time be used, said member being movable between vertically displaced first and second positions, and means operatively connecting said capacitors for simultaneous operation by movement of said buoyant member between its first and second positions, the last named means including magnetically operated coupling means, said capacitors being so arranged that as the capacitance of one capacitor increases, the capacitance of the other decreases and at said first position of said buoyant member one of said capacitors is at its position of maximum capacitance and the other capacitor is at its position of minimum capacitance, while at said second position of said buoyant member said one of said capacitors is at its position of minimum capacitance and said other of said capacitors is at its position of maximum capacitance, said capacitors having equal minimum and maximum capacitances respectively when the dielectric medium between their plates is the same.

9. Density-responsive apparatus in accordance with claim 2, in which said first and second variable capacitors have the same capacitance values respectively when the media filling the spaces between their plates has the same dielectric constant; in which when said buoyant member operating said capacitors is at the upper limit of its movement due to the liquid in which it is immersed having a higher bulk density than said buoyant member, said first capacitor is at its position of minimum capacitance and said second capacitor is at its position of maximum capacitance; and in which when said buoyant member is at its lower position due to the liquid in which it is immersed having a lesser bulk density than said buoyant member, said first capacitor is at its position of maximum capacitance and said second capacitor is at its position of minimum capacitance, whereby when said capacitors are connected in parallel with each other, the total capacitance of both capacitors is a function of K−1 where "K" is the dielectric constant of the liquid in which said first capacitor and said buoyant member are immersed.

10. Density-responsive capacitance apparatus for producing a capacitance having a predetermined relationship with the density and dielectric constant of a liquid, comprising a plurality of float-operated units; each of said units including a first variable capacitor having spaced plates with the space therebetween filled with said liquid, a second variable capacitor having spaced plates with the space therebetween free of said liquid, a buoyant member immersed in said liquid and having a weight per unit volume which is predetermined with respect to the density of various liquids with which it may from time to time be used, said member being movable between vertically displaced first and second positions, said buoyant member being arranged to be moved from one of its positions to the other in accordance with the density of said liquid in which it is immersed being respectively above or below the predetermined bulk density of said buoyant member, and means operatively connecting said capacitors for simultaneous operation by movement of said buoyant member between its first and second positions, said capacitors being so arranged that as the capacitance of one capacitor increases the capacitance of the other decreases; said buoyant members of said plurality of units being arranged with a series of predetermined bulk densities coordinated to cover the range of densities of the liquids with which the apparatus may from time to time be used; and electrical circuit means connecting all said capacitors together.

11. A capacitance type gauge for measuring the weight of a liquid in a tank, in which the tank may be used from time to time with liquids having different densities and different dielectric constants, comprising a measuring condenser including spaced electrodes positioned in the tank so that the liquid therein enters the space between the electrodes to an extent depending upon the level of the liquid in the tank, the capacitance value of said measuring condenser being dependent upon the amount of liquid in the tank and the dielectric constant thereof; a balanceable network including first, second, third and fourth sources of alternating voltage, all of the same frequency, and all having a common circuit connection which is at a ground base potential for the network, said first and second sources of voltage being of opposing phase, said third and fourth sources of voltage being of opposing phase, said third source being of the same phase as said second source and said fourth source being of the same phase as said first source, and the amplitude of said first and second sources on the one hand and said third and fourth sources on the other being relatively variable; first circuit means coupling said first source through said measuring condenser to a common circuit reference point; first and second balancing condensers, the capacitance values of which are independent of the amount and dielectric constant of said liquid being measured, a second circuit means coupling said second source of voltage through said first balancing condenser to said common reference point; compensating capacitance means, the capacitance value of which is a function of the dielectric constant and of the density of said liquid and which is independent of the amount and level thereof, including a plurality of float-operated units, each of said units including: a first variable compensating capacitor having spaced plates with the space therebetween always filled with a representative sample of the liquid being measured, a second variable compensating capacitor having spaced plates with the space therebetween free of said liquid and filled with a dielectric having a dielectric constant value of unity, and a float immersed in said liquid and having a weight per unit volume which is predetermined with respect to the density of various liquids with which it may from time to time be used, said float being movable between vertically spaced first and second positions, said float being arranged to be moved from one of its positions to the other in accordance with the density of said liquid in which it is immersed being respectively above or below the predetermined bulk density of said float, means operatively connecting said capacitors for simultaneous operation by movement of said float between its first and second positions, said capacitors being so arranged that as the capacitance of one capacitor increases, the capacitance of the other decreases, an electric circuit connecting said compensating capacitors together in parallel; the floats of each of said plurality of float-operated units being arranged to have bulk densities spaced throughout the range of densities of the liquids with which the system is to be used from time to time, so that the number of floats in their upper position as compared with the whole number of floats will be a function of the density of the liquid in which all said floats are immersed at any one time; a third circuit coupling said third source of voltage through all said compensating capacitance means to said common reference point; a fourth circuit coupling said fourth source of voltage through said second balancing condenser to said common reference point; potential responsive means, means connecting said potential responsive means to said common reference point and to said ground base potential for said network so as to be responsive to a resultant of all the potentials of all phases connected to said common reference point, and means actuated by said potential responsive means to vary the relative amplitude of said first and second sources with respect to that of said third and fourth sources in a direction tending to reduce the potential between said common reference point and said ground base potential substantially to zero to balance said network.

12. A capacitance-type gauge in accordance with claim 11, in which said first and second sources of voltage are relatively fixed, and said third and fourth sources of voltage are relatively and simultaneously variable; and in which said means actuated by said potential responsive means is effective simultaneously to vary the voltage of said third and fourth sources, so as to balance the network.

13. A capacitance-type gauge in accordance with claim 11, in which said first and second sources of voltage are constituted by the opposite end portions of a secondary winding of a power transformer, the primary winding of which is energized by an A. C. current, a mid-portion of said secondary winding being connected to a ground base potential for the system; a potentiometer having its resistance connected between said first source of voltage and said ground base potential, the variable tap of said potentiometer constituting said third source of voltage; and in which said variable tap is connected to one end of the primary winding of a phase-reversing transformer, the other end of the primary winding of which is grounded, the secondary winding of said phase-reversing transformer having one end grounded and the other end constituting said fourth source of voltage.

References Cited in the file of this patent

UNITED STATES PATENTS

| | | |
|---|---|---|
| 1,557,725 | Proctor | Oct. 20, 1925 |
| 2,416,808 | Weiss | Mar. 4, 1947 |
| 2,622,442 | Boisblanc | June 10, 1949 |
| 2,688,875 | Boisblanc | Sept. 14, 1954 |
| 2,720,626 | Wing | Oct. 11, 1955 |

FOREIGN PATENTS

| | | |
|---|---|---|
| 930,180 | France | July 28, 1947 |
| 684,348 | Great Britain | Dec. 17, 1952 |